(12) United States Patent
Sung et al.

(10) Patent No.: US 12,331,786 B2
(45) Date of Patent: Jun. 17, 2025

(54) HOUSING FIXING STRUCTURE OF AIR FOIL JOURNAL BEARING

(71) Applicant: Hanon Systems, Daejeon (KR)

(72) Inventors: Yeol Woo Sung, Daejeon (KR); Hyun Chil Kim, Daejeon (KR); Gunwoong Park, Daejeon (KR); Min Gyu Park, Daejeon (KR); Chi Yong Park, Daejeon (KR); Hyun Sup Yang, Daejeon (KR); Jong Sung Lee, Daejeon (KR); Kyu Sung Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/277,255

(22) PCT Filed: Dec. 29, 2021

(86) PCT No.: PCT/KR2021/020132
§ 371 (c)(1),
(2) Date: Aug. 15, 2023

(87) PCT Pub. No.: WO2022/196907
PCT Pub. Date: Sep. 22, 2022

(65) Prior Publication Data
US 2024/0125357 A1    Apr. 18, 2024

(30) Foreign Application Priority Data
Mar. 17, 2021  (KR) ................. 10-2021-0034525

(51) Int. Cl.
F16C 35/02    (2006.01)
F16C 17/02    (2006.01)

(52) U.S. Cl.
CPC ............ *F16C 35/02* (2013.01); *F16C 17/024* (2013.01)

(58) Field of Classification Search
CPC .................................................... F16C 17/024
See application file for complete search history.

(56) References Cited

U.S. PATENT DOCUMENTS 6,964,522 B2 * 11/2005 Kang ................. F16C 27/02
                                                384/106
7,648,279 B2 *  1/2010 Struziak ............ F16C 17/024
                                                384/106
(Continued)

FOREIGN PATENT DOCUMENTS

CN    109424647 A    3/2019
JP    2002061645 A   2/2002
(Continued)

OTHER PUBLICATIONS

International Search Report issued in PCT/KR2022/020132 on Mar. 30, 2022.

*Primary Examiner* — James Pilkington
(74) *Attorney, Agent, or Firm* — NORTON ROSE FULBRIGHT US LLP

(57) ABSTRACT

The present invention relates to an air foil journal bearing in which air is introduced between a foil and a rotor rotating at high speed and generates pressure to support a radial load of the rotor and allow the rotor to rotate smoothly, and more particularly, to a housing fixing structure of an air foil journal bearing that improves durability against external impact or vibration by restricting an axial movement of a bump by means of two opposite ends of the bump and a top foil fixing portion.

11 Claims, 16 Drawing Sheets

(56) References Cited

U.S. PATENT DOCUMENTS

| | | | |
|---|---|---|---|
| 8,353,631 B2 * | 1/2013 | Kim | F16C 17/024 |
| | | | 384/106 |
| 8,783,952 B1 | 7/2014 | Beers et al. | |
| 9,028,149 B2 * | 5/2015 | Rosen | F16C 43/02 |
| | | | 384/106 |

FOREIGN PATENT DOCUMENTS

| | | | |
|---|---|---|---|
| JP | 2017194117 A | 10/2017 | |
| JP | 2020122555 A | 8/2020 | |

* cited by examiner

[FIG. 1]

Prior Art

ions of the top foil radially outward. an embodiment of the present invention provides a housing fixing structure of an air foil journal bearing including

HOUSING FIXING STRUCTURE OF AIR FOIL JOURNAL BEARING

CROSS REFERENCE TO RELATED APPLICATIONS

This patent application is a national phase under 35 U.S.C. § 371 of International Patent Application No. PCT/KR2021/020132 filed Dec. 29, 2021, which claims the benefit of priority from Korean Patent Application No. 10-2021-0034525 filed Mar. 17, 2021, each of which is hereby incorporated herein by reference in its entirety for all purposes.

TECHNICAL FIELD

The present invention relates to an air foil journal bearing in which air is introduced between a foil and a rotor rotating at high speed and generates pressure to support a radial load of the rotor and allow the rotor to rotate smoothly, and more particularly, to a housing fixing structure of an air foil journal bearing that improves durability against external impact or vibration by restricting an axial movement of a bump by means of two opposite ends of the bump and a top foil fixing portion.

BACKGROUND ART

Typically, a fuel cell electric vehicle includes a fuel cell stack configured to produce electricity, a humidifier configured to increase a humidity of air to be supplied to the fuel cell stack, a fuel supply part configured to supply hydrogen to the fuel cell stack, an air supply part configured to supply air, which contains oxygen, to the fuel cell stack, and a cooling module configured to cool the fuel cell stack.

The air supply part includes an air cleaner configured to filter out foreign substances contained in the air, an air compressor configured to compress and supply the air filtered by the air cleaner, a cooling device configured to cool the compressed high-temperature air, a humidifier configured to increase a humidity of the air, and a valve configured to adjust a flow rate.

The air compressor compresses the air, which is sucked from the outside, by using a compressor impeller and transfers the air to the fuel cell stack. In this case, the compressor impeller is connected to a rotary shaft that receives power from a drive part. In general, the drive part operates the rotary shaft by means of electromagnetic induction between a stator and the rotary shaft. In this case, the air compressor has an air foil bearing to allow the rotary shaft to rotate easily at high speed.

The bearing refers to a mechanical element configured to fix the rotary shaft at a predetermined position, support a weight of the shaft and a load applied to the shaft, and enable the rotary shaft to rotate.

The air foil bearing refers to a bearing that supports a load by means of pressure generated as air, which is a fluid having a viscosity, is introduced between foils that adjoin a rotor or bearing disc when a rotor (or rotary shaft) rotates at high speed. In addition, among the air foil bearings, an air foil journal bearing refers to a bearing configured to support a radial load of the rotor that is applied in a direction perpendicular to the rotor.

In this case, as illustrated in FIG. 1, a general air foil journal bearing is configured such that a bump 20 is installed along an inner circumferential surface 12 of a hollow portion 11 of a bearing housing 10, and a top foil 30 is disposed inside the bump 20. A rotor 40 (or a rotary shaft) is disposed inside the top foil 30, such that the rotor may rotate in a state in which an inner circumferential surface of the top foil 30 and an outer circumferential surface of the rotor 40 are spaced apart from each other. In this case, the bump 20 and the top foil 30 respectively have bent portions made as circumferential ends of the bump 20 and the top foil 30 are bent radially outward, and the bent portions 21 and 31 are inserted and coupled into a slot 13 formed in the bearing housing 10, such that the bump 20 and the top foil 30 are fixed to the bearing housing 10 without being rotated or pushed in the circumferential direction when the rotor rotates.

The air foil journal bearing in the related art is configured such that both the bent portion 21 of the bump 20 and the bent portion 31 of the top foil 30 are fixed into the single slot 13. In this case, no means for restricting an axial movement of the bump 20 is provided at a side of the bump foil 20 opposite to the bent portion 21. For this reason, the side of the bent portion 21, which is opposite to the bump foil 20, may protrude axially outward from the housing 10 when the rotor rotates and come into contact with a rotary shaft, a runner, an impeller, or the like that is adjacent to the bearing, which causes a problem in that the bearing is damaged.

In addition, when the rotor 40 is structurally positioned at a center of a rotation axis while being floated in the hollow portion 11 by a high-speed rotation thereof, the pressure cannot be generated, and the rotational stability is degraded by self-excited vibration of the rotor 40.

DISCLOSURE

Technical Problem

The present invention has been made in an effort to solve the above-mentioned problem, and an object of the present invention is to provide a housing fixing structure of an air foil journal bearing, in which an insertion fixing portion, which is penetrated by a bent portion of a top foil, is formed in a bump, the insertion fixing portion restricts an axial movement of the bump, and a bent portion of the bump is additionally fixed into a key groove formed separately from a key groove into which the bent portion of the top foil is fixed, thereby doubly restricting the axial movement of the bump.

Another object of the present invention is to provide a housing fixing structure of an air foil journal bearing, in which a bent portion of the bump may move in a key groove in a circumferential direction.

Still another object of the present invention is to provide a housing fixing structure of an air foil journal bearing, in which a bump has a plurality of convex portions disposed in a circumferential direction and protruding radially inward, and protruding lengths of the convex portions are different from one another.

Technical Solution

An embodiment of the present invention provides a housing fixing structure of an air foil journal bearing including: a housing having a hollow portion in which a rotor is disposed, the housing including a first key groove concavely formed radially outward from an inner circumferential surface of the housing so as to be connected to the hollow portion; a top foil provided inside the housing, formed in a circumferential direction, and having a pair of first bent portions formed by bending two opposite circumferential ends of the top foil radially outward, the pair of first bent portions being inserted into the first key groove; and a bump provided between the housing and the top foil and formed in the circumferential direction, in which the bump includes: an insertion fixing portion formed through the bump so that the first bent portions of the top foil penetrate the insertion fixing portion and are fitted into the first key groove; and second bent portions formed by bending two opposite circumferential ends of the bump radially outward, in which the housing includes a second key groove disposed to be spaced apart circumferentially from the first key groove and concavely formed radially outward from the inner circumferential surface of the housing so as to be connected to the hollow portion, and in which the second bent portions are fitted into the second key groove.

In addition, a circumferential width of the second key groove may be larger than a sum of circumferential thicknesses of the pair of second bent portions, and the bump may be configured such that a second-first bent portion formed at one end and a second-second bent portion formed at the other end are spaced apart from each other at a predetermined distance in the circumferential direction and inserted into the second key groove.

In another embodiment, a circumferential width of the second key groove may be larger than a sum of circumferential thicknesses of the pair of second bent portions, the second bent portions may include a second-first bent portion formed at one end, and a second-second bent portion formed at the other end, the second-first bent portion may include: a first inclined portion bent radially outward and inclined radially outward toward the second-second bent portion; and a first junction portion bent radially outward from the first inclined portion and joined to the second-second bent portion, and the second-second bent portion may include: a second inclined portion bent radially outward and inclined radially outward toward the second-first bent portion; and a second junction portion bent radially outward from the second inclined portion and joined to the first junction portion.

In addition, the bearing may further include a fixing pin coupled to the second key groove to fix the first and second junction portions and having a fixing groove into which the first and second junction portions are fitted.

In addition, the first bent portion may have two opposite axial ends spaced apart inward from two opposite axial ends of the top foil, and an axial width of the insertion fixing portion may correspond to an axial length of the first bent portion.

In addition, the second key groove may be spaced apart from a side opposite to the first key groove at a predetermined distance in the circumferential direction.

In addition, the second key groove may be spaced apart from the side opposite to the first key groove at a predetermined distance in a direction opposite to a rotation direction of the rotor.

In addition, the bump may have a plurality of convex portions protruding radially inward and formed in the circumferential direction, and the convex portion formed in each of a plurality of N regions separated in the circumferential direction may be different in protruding length from the convex portion formed in another region.

In addition, the bump may include: a first region formed at one side of the first bent portion based on the radial direction based on a boundary between the first bent portion of the top foil and the second bent portion of the bump; and a second region formed at the other side of the first bent portion based on the radial direction, and a protruding length of a first convex portion formed in the first region and a protruding length of a second convex portion formed in the second region may be different from each other.

In addition, when a circumferential length of the first region is longer than a circumferential length of the second region, the protruding length of the first convex portion may be longer than a protruding length of the second convex portion.

In addition, the bearing may be configured such that the protruding lengths of the protruding portions formed in the same region are equal to one another.

In addition, a difference in length between the first protruding portion formed in the first region and the second protruding portion formed in the second region may be 0.01 mm to 0.1 mm.

Further, a ratio of a circumferential length of the first region to a circumferential length of the second region may be at most 65%:35% and at least 55%:45%.

Advantageous Effects

According to the housing fixing structure of the air foil journal bearing of the present invention configured as described above, the axial movement of the bump may be doubly restricted by the ends of the bump and the insertion fixing portion fitted with the bent portions of the top foil, thereby preventing damage to the bearing that may be caused by the axial movement of the bump.

In addition, the bent portions of the bump may be configured to be movable in the circumferential direction even in the state in which the bent portions of the bump are fitted into the key groove, thereby preventing the deterioration in driving performance that may occur when the circumferential movement of the bump is fixed.

In addition, the protruding lengths of the convex portions formed on the bump may be different from one another to prevent the self-excited vibration of the rotor, thereby ensuring the rotational stability of the rotor.

Figure 1:
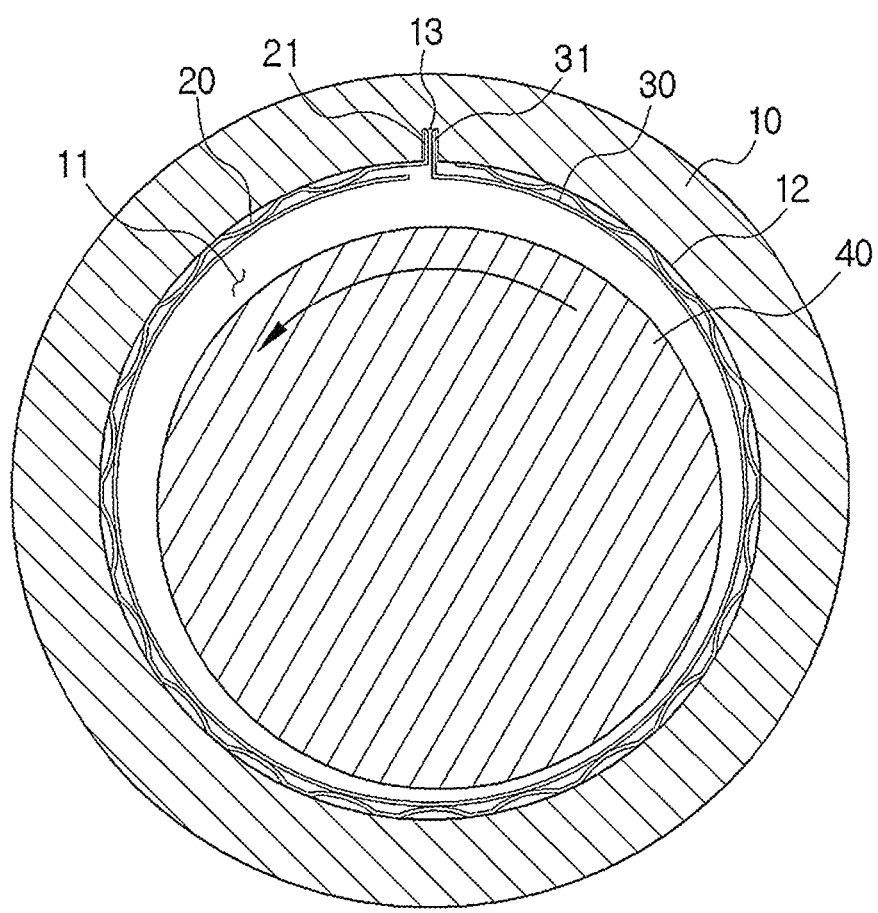
FIG. 1 is a cross-sectional view of an air foil journal bearing in the related art.

DESCRIPTION OF REFERENCE NUMERALS 1000 to 7000: Air foil journal bearings
F1 to F7: Foil parts
A1: First region
A2: Second region
100: Housing
100a: First housing
100b: Second housing
100c: First housing
100d: Second housing
101 to 109: First to ninth bodies
106a: first bolting holes
107a: second bolting holes
110: First key groove
120: Second key groove
150: Hollow portion
150a: Hollow portion
150b: Hollow portion
150c: Hollow portion
150d: Hollow portion
200: Top foil
250: First bent portion
251: First-first bent portion
252: First-second bent portion
300: Bump
301, 310, 320: Protruding portion
310: Insertion fixing portion
350, 360: Second bent portion
351: Second-first bent portion
352: Second-first bent portion
361: Second-first bent portion
361a: First inclined portion
361b: First junction portion
362: Second-second bent portion
362a: Second inclined portion
362b: Second junction portion
400: Mid-foil
500: Outer bump
600: Fixing pin

MODE FOR INVENTION

Hereinafter, the embodiments of the present invention will be described in detail with reference to the drawings.

Embodiment 1

Figure 2:
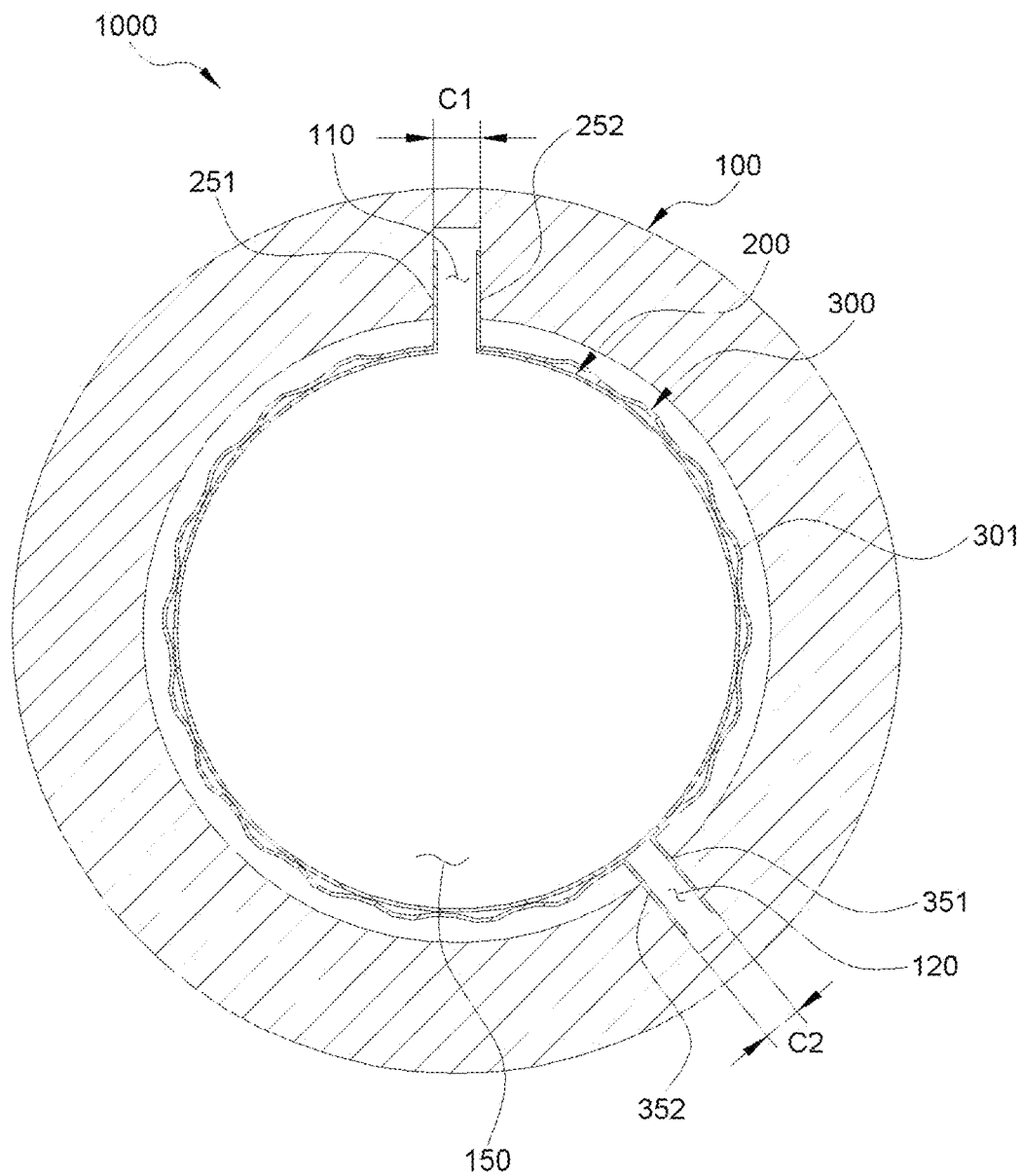
FIG. 2 is a cross-sectional view of an air foil journal bearing according to a first embodiment of the present invention.
Figure 3:
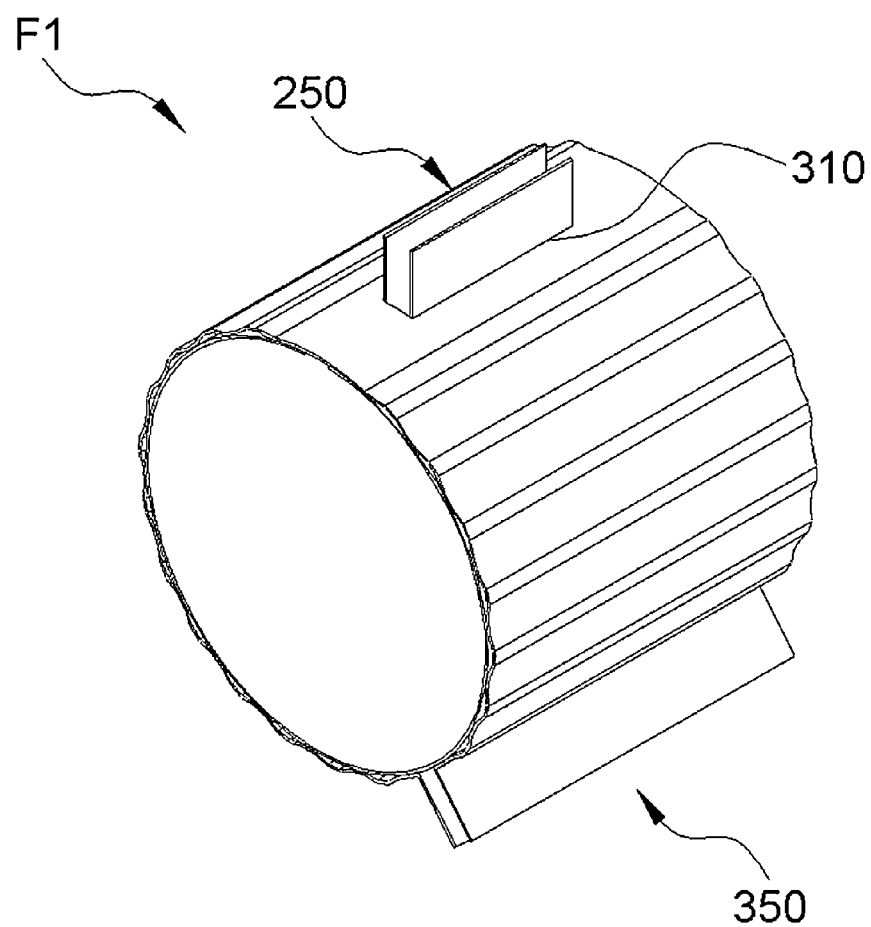
FIG. 3 is a perspective view of a foil part of the air foil journal bearing according to the first embodiment of the present invention.
Figure 4:
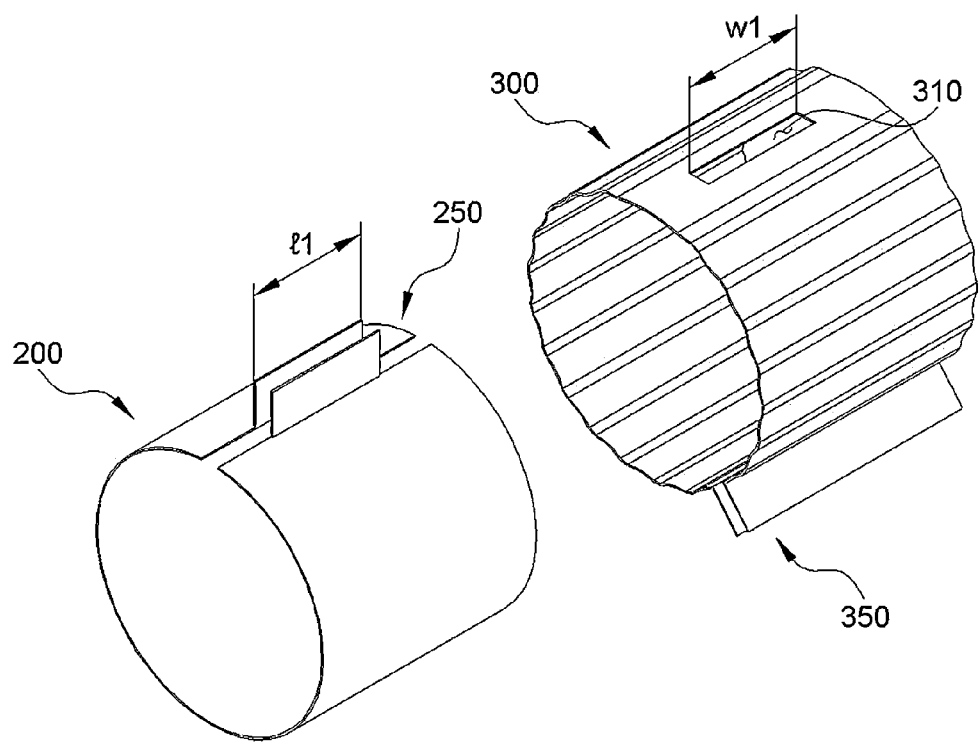
FIG. 4 is an exploded perspective view of the foil part of the air foil journal bearing according to the first embodiment of the present invention.

FIG. 2 is a cross-sectional view of an air foil journal bearing 1000 (hereinafter, referred to as a 'bearing') according to a first embodiment of the present invention, FIG. 3 is a perspective view of a foil part F1 of the bearing 1000 according to the first embodiment of the present invention, and FIG. 4 is an exploded perspective view of the foil part F1 of the air foil journal bearing 1000 according to the embodiment of the present invention.

As illustrated, the bearing 1000 includes a housing 100 configured to accommodate the foil part F1, a top foil 200 provided between a rod (not illustrated) of a hollow portion 150 of the housing 100, and a bump 300 provided between the housing 100 and the top foil 200.

The housing 100 may have therein the hollow portion 150 formed through two opposite axial surfaces of the housing 100. A first key groove 110 may be provided in the axial direction and concavely formed radially outward from an inner circumferential surface of the hollow portion 150 so as to communicate with the hollow portion 150. A second key groove 120 may be provided in the axial direction, concavely formed radially outward from the inner circumferential surface of the hollow portion 150 so as to communicate with the hollow portion 150, and spaced apart from the first key groove 110 in a circumferential direction. The first key groove 110 may be formed to fix the top foil 200, and the second key groove 120 may be formed to fix the bump 300. The housing 100 may be provided in an air compressor or the like.

The top foil 200 is disposed along the inner circumferential surface of the hollow portion 150 and provided in the form of a flat plate having a small thickness. In addition, the top foil 200 has first bent portions 250 formed by bending two opposite circumferential ends of the top foil 200 radially outward. Therefore, in a state in which the top foil 200 is rolled in a cylindrical shape so as to correspond to the inner circumferential surface of the hollow portion 150, the pair of first bent portions 250, which is disposed adjacent to each other, may be inserted into the first key groove 110, such that the top foil 200 may be disposed in the housing 100. The first bent portions 250 may include a first-first bent portion 251 formed at one end, and a first-second bent portion 252 formed at the other end. The first-first bent portion 251 and the first-second bent portion 252 may be disposed to be spaced apart from each other at a predetermined distance. That is, a circumferential width C1 of the first key groove 110 may be larger than a circumferential thickness of the first bent portion 250 so that the first bent portion 250 may move a predetermined distance in the circumferential direction.

The bump 300 may be disposed between the top foil 200 and the inside of the hollow portion 110 of the housing 100. The bump 300 may be in close contact with the inner circumferential surface of the housing 100 and disposed in the circumferential direction. (The top foil 200 may be in close contact with an inner circumferential surface of the bump 300). In this case, the bump 300 is provided in the form of a plate having a small thickness. The bump 300 may have a plurality of protruding portions 301 convexly protruding radially inward and spaced apart from one another in the circumferential direction. In addition, the bump 300 has second bent portions 350 formed by bending two opposite circumferential ends of the bump 300 radially outward. Therefore, in a state in which the bump 300 is rolled in a cylindrical shape so as to correspond to the inner circumferential surface of the hollow portion 150, the pair of second bent portions 350, which is disposed adjacent to each other, may be inserted into the second key groove 120, such that the bump 300 may be disposed between the housing 100 and the top foil 200. The second bent portion 350 may include a second-first bent portion 351 formed at one end, and a second-second bent portion 352 formed at the other end. The second-first bent portion 351 and the second-second bent portion 352 may be disposed to be spaced apart from each other at a predetermined distance. That is, a circumferential width C2 of the second key groove 130 may be larger than a circumferential thickness of the second bent portion 350 so that the second bent portion 350 may move a predetermined distance in the circumferential direction.

That is, the bump 300 and the top foil 200 may be disposed in the rolled state in the hollow portion 110 that is the inside of the housing 100. The first bent portions 250 of the top foil 200 may be inserted into the first key groove 110, and the second bent portions 350 of the bump 300 may be inserted into the second key groove 120. In this case, in a state in which the top foil 200 and the bump 300 are rolled while overlapping each other at one side of the housing 100 based on the axial direction, the top foil 200 and the bump 300 may be assembled by being inserted into the housing 100. The bump 300 may be inserted and assembled into the housing 100 first, and then the top foil 200 may be inserted and assembled into the bump 300.

Meanwhile, the bump 300 may have an insertion fixing portion 310 penetrated by the first bent portions 250 so that the first bent portions 250 of the top foil 200 may be inserted into the first key groove 110. Therefore, the first bent portions 250 may be fitted into the first key groove 110 through the insertion fixing portion 310 formed in the bump 300 that surrounds an outer circumferential surface of the top foil 200. In addition, it is possible to obtain an effect of fixing the bump 300 to the first key groove 110 of the housing 100 through the first bent portions 250 that penetrate the insertion fixing portion 310 of the bump 300. Two opposite axial ends of each of the first bent portions 250 may be spaced apart inward from two opposite axial ends of the top foil 200 at a predetermined distance so that the first bent portions 250 are fitted into the insertion fixing portion 310. An axial length L1 of the first bent portion 250 may correspond to an axial width W1 of the insertion fixing portion 310. Therefore, an axial movement of the bump 300 toward the first key groove 110 may be restricted by the insertion fixing portion 310 fitted with the first bent portions 250, and an axial movement of the bump 300 toward the second key groove 120 may be restricted by the second bent portions 350 fitted into the second key groove 120. That is, the axial movements of the bump 300 may be restricted at a plurality of points, which may improve the effect of restricting the axial movements.

In addition, the second key groove 120 may be disposed to be spaced apart circumferentially, at a predetermined distance, from a side opposite to the first key groove 110. More specifically, the second key groove 120 may be disposed to be spaced apart, at a predetermined distance, from the first key groove 110 in a circumferential direction opposite to a rotation direction of the rotor. With this configuration, the second key groove 120 is formed to be closer to a point at which air pressure is generated, which improves durability against external impact or vibration.

Embodiment 2

Figure 5:
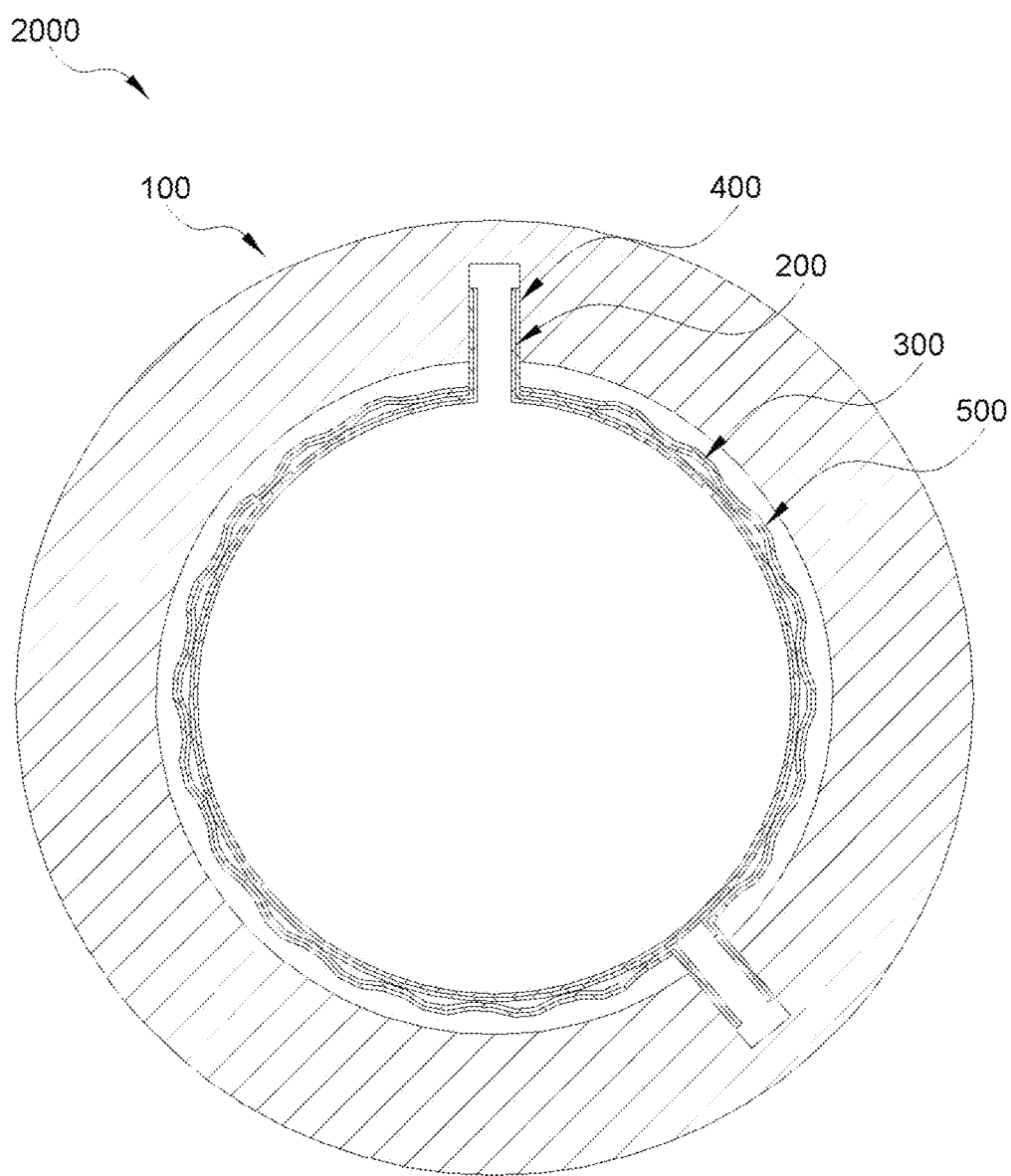
FIG. 5 is a cross-sectional view of an air foil journal bearing according to a second embodiment of the present invention.
Figure 6:
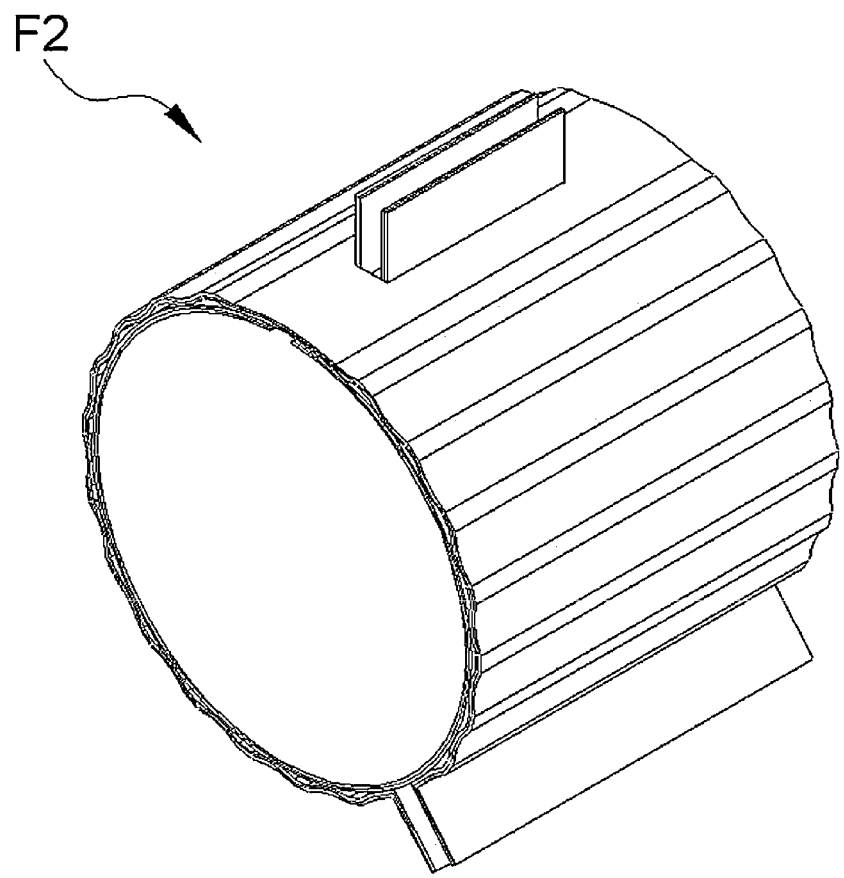
FIG. 6 is a perspective view of a foil part of the air foil journal bearing according to the second embodiment of the present invention.
Figure 7:
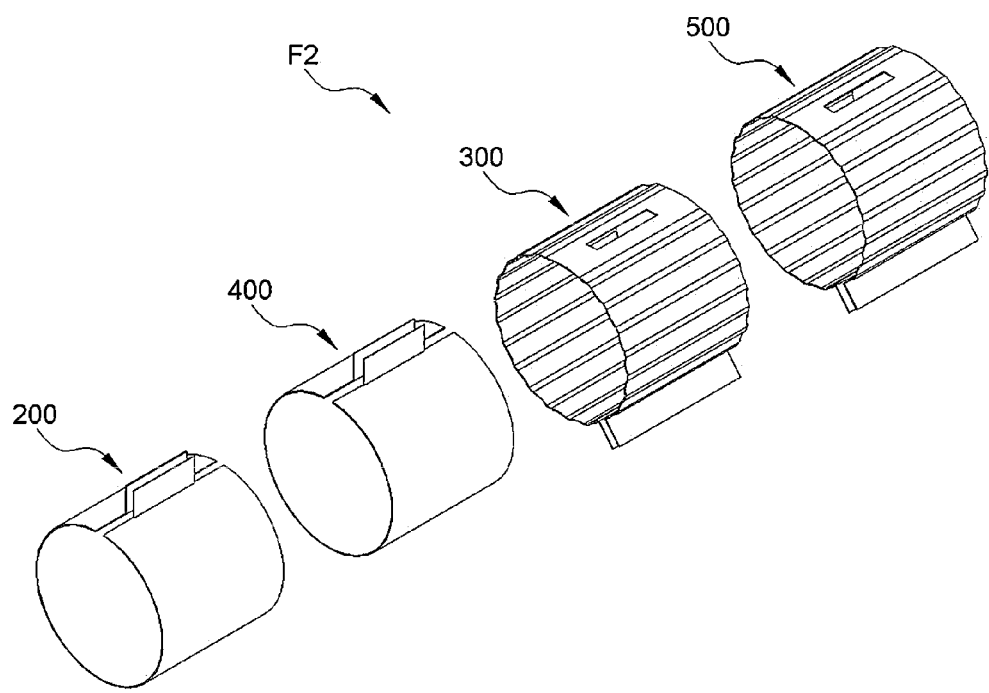
FIG. 7 is an exploded perspective view of the foil part of the air foil journal bearing according to the second embodiment of the present invention.

FIG. 5 is a cross-sectional view of an air foil journal bearing 2000 according to a second embodiment of the present invention, FIG. 6 is a perspective view of a foil part F2 of the air foil journal bearing according to the second embodiment of the present invention, and FIG. 7 is an exploded perspective view of the foil part F2 of the air foil journal bearing according to the second embodiment of the present invention.

The air foil journal bearing 2000 further includes an outer bump 500 that surrounds the bump 300. That is, as illustrated, the bumps 300 and 500 may be configured as two layers, and the outer bump 500 may be disposed outside the bump 300. The outer bump 500 may be in close contact with the inner circumferential surface of the housing 100, and the bump 300 may be in close contact with an inner portion of the outer bump 500. In addition, the bumps 300 may be configured as three or more layers.

In addition, the air foil journal bearing 2000 may further include a mid-foil 400 disposed between the top foil 200 and the bump 300 and configured to surround the top foil 200. That is, as illustrated, the two foils, i.e., the top foil 200 and the mid-foil 400 may be provided inside the bump 300. The mid-foil 400 may be disposed outside the top foil 200, the mid-foil 400 may be in close contact with the protruding portions 301 disposed inside the bump 300, and the top foil 200 may be in close contact with an inner portion of the mid-foil 300. In addition, the top foil 200 or the mid-foil 400 may be provided as two or more layers.

In addition, the mid-foil 400 may have a pair of bent portions that may be in contact with outer portions of the first bent portions and inserted into the first key groove. The outer bump 500 may have an outer bump insertion fixing portion corresponding to the insertion fixing portion of the bump 300. In addition, the outer bump 500 has a pair of bent portions that may be in contact with outer portions of the second bent portions and inserted into the second key groove.

Embodiment 3

Figure 8:
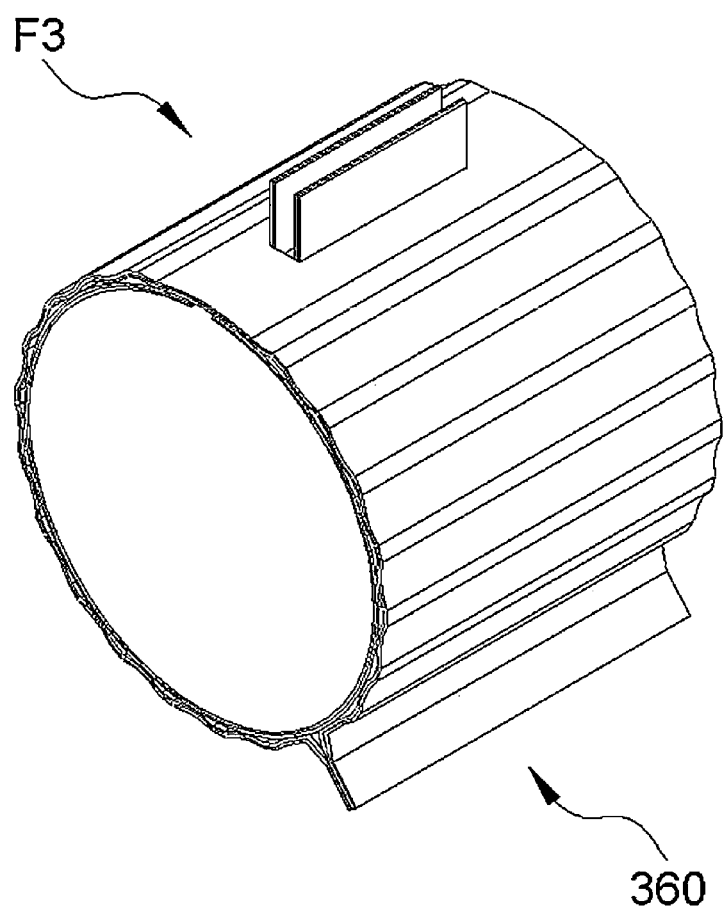
FIG. 8 is a perspective view of a foil part of an air foil journal bearing according to a third embodiment of the present invention.
Figure 9:
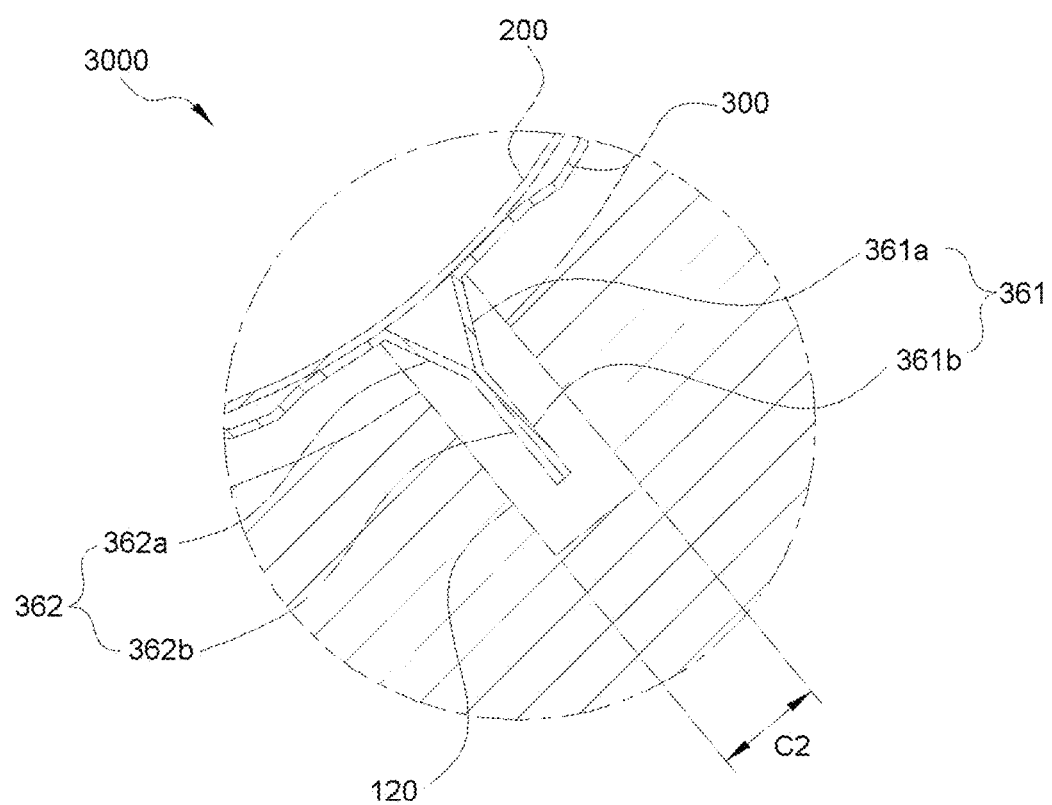
FIG. 9 is a partially enlarged cross-sectional view of the air foil journal bearing according to the third embodiment of the present invention.

FIG. 8 is a perspective view of a foil part F3 of an air foil journal bearing according to a third embodiment of the present invention, and FIG. 9 is a partially enlarged cross-sectional view of an air foil journal bearing 3000 according to the third embodiment of the present invention.

As illustrated, the bump 300 of the air foil journal bearing 3000 according to the third embodiment includes second bent portions 361 and 362, and the second bent portions 361 and 362 include a second-first bent portion 361 formed at one end of the bump 300, and a second-second bent portion 362 formed at the other end of the bump 300. The ends of the second bent portions of the bump 300 according to the present embodiment may be joined to each other. A circumferential length of the bump 300 may be changed as the second bent portions of the bump 300 are elastically deformed in the circumferential direction.

To this end, the second-first bent portion 361 may include a first inclined portion 361a bent radially outward and inclined radially outward toward the second-second bent portion 362, and a first junction portion 361b bent radially outward from the first inclined portion 361a and joined to the second-second bent portion 362. In addition, the second-second bent portion 362 may include a second inclined portion 362a bent radially outward and inclined radially outward toward the second-first bent portion 361, and a second junction portion 362b bent radially outward from the second inclined portion 362a and joined to the first junction portion 361b. Therefore, as illustrated, the second bent portions 361 and 362 may define a Y-shaped cross-section.

Embodiment 4

Figure 10:
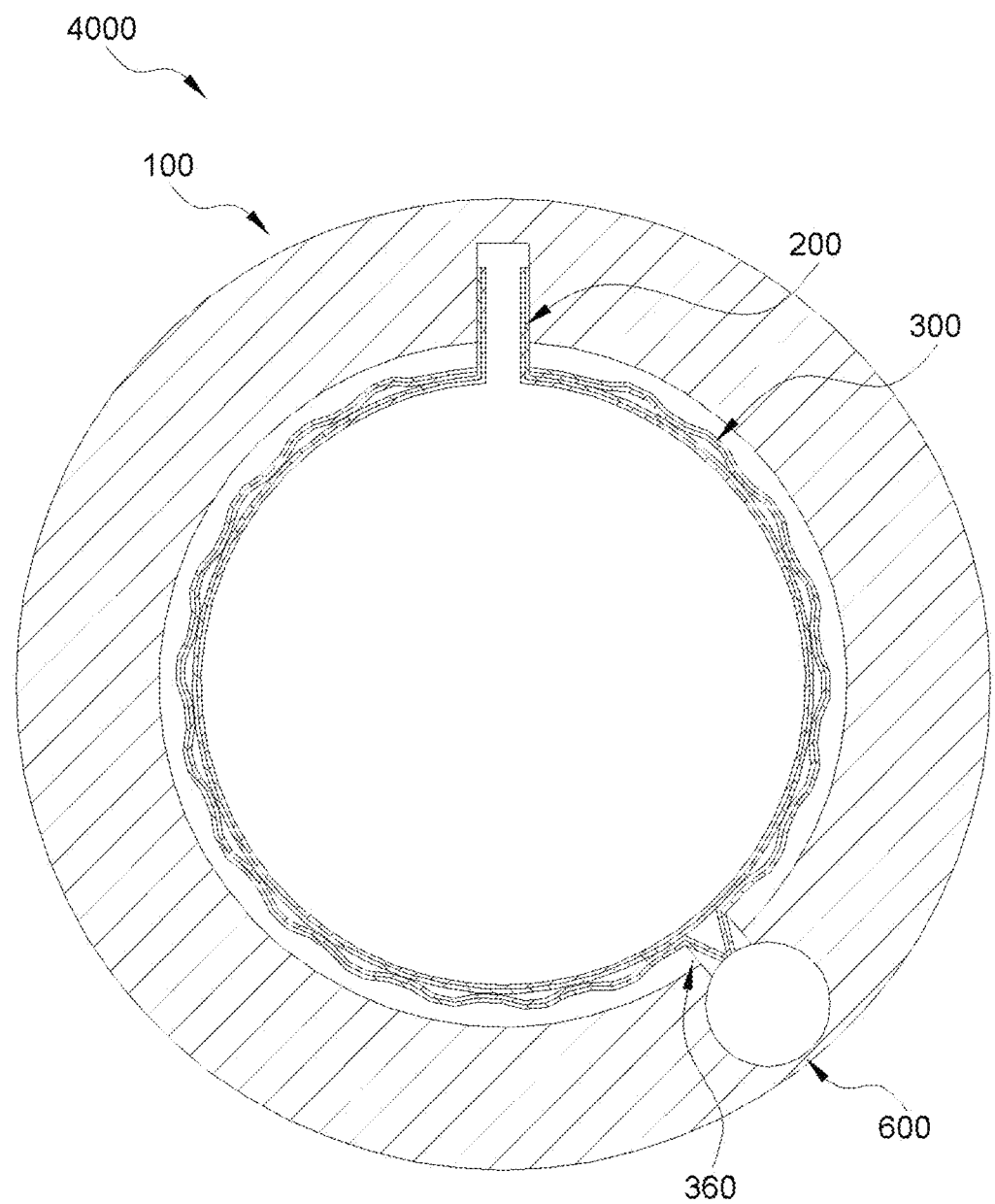
FIG. 10 is a cross-sectional view of an air foil journal bearing according to a fourth embodiment of the present invention.

FIG. 10 is a cross-sectional view of an air foil journal bearing 4000 according to a fourth embodiment of the present invention. As illustrated, the air foil journal bearing 4000 includes the same configuration as the air foil journal bearing 3000 according to the third embodiment. In addition, the air foil journal bearing 4000 may further include a fixing pin 600 for fixing the first and second junction portions 361b and 362b of the second bent portions 360. The fixing pin 600 may be fixed and fitted into the second key groove 120 of the housing 100 to restrict a circumferential movement. The fixing pin 600 may have a fitting groove into which the first and second junction portions 361b and 362b are fitted, such that the circumferential movements of the first and second junction portions 361b and 362b may be restricted.

Embodiment 5

Figure 11:
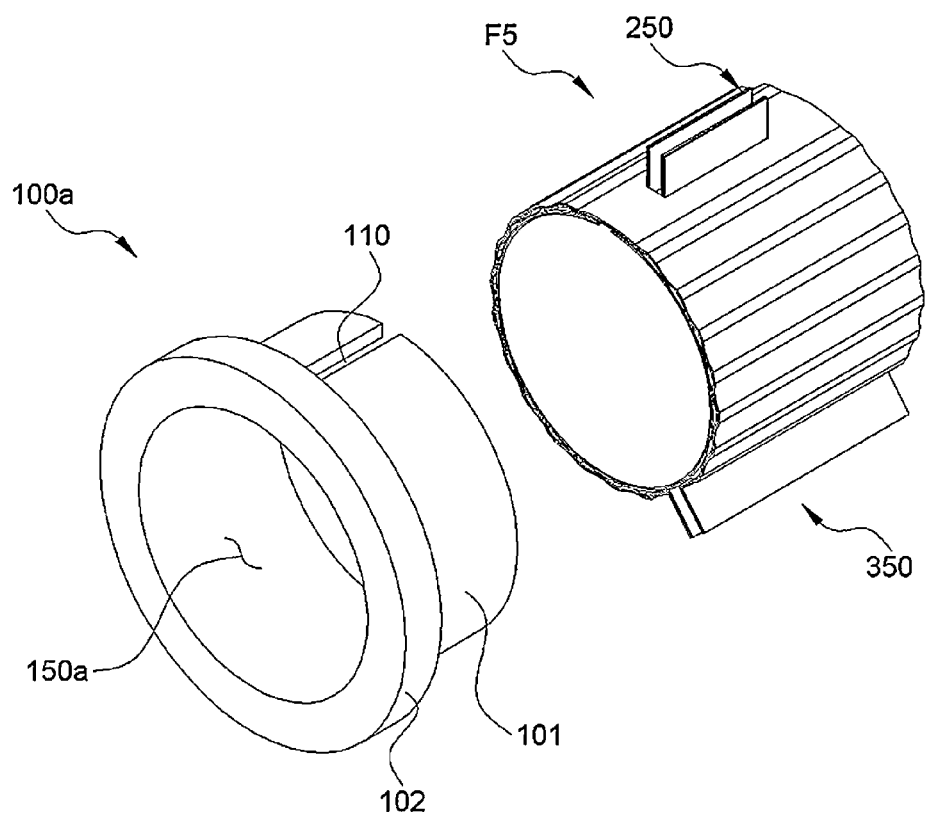
FIGS. 11 and 12 are exploded perspective views of a housing and a foil part of an air foil journal bearing according to a fifth embodiment of the present invention.
Figure 12:
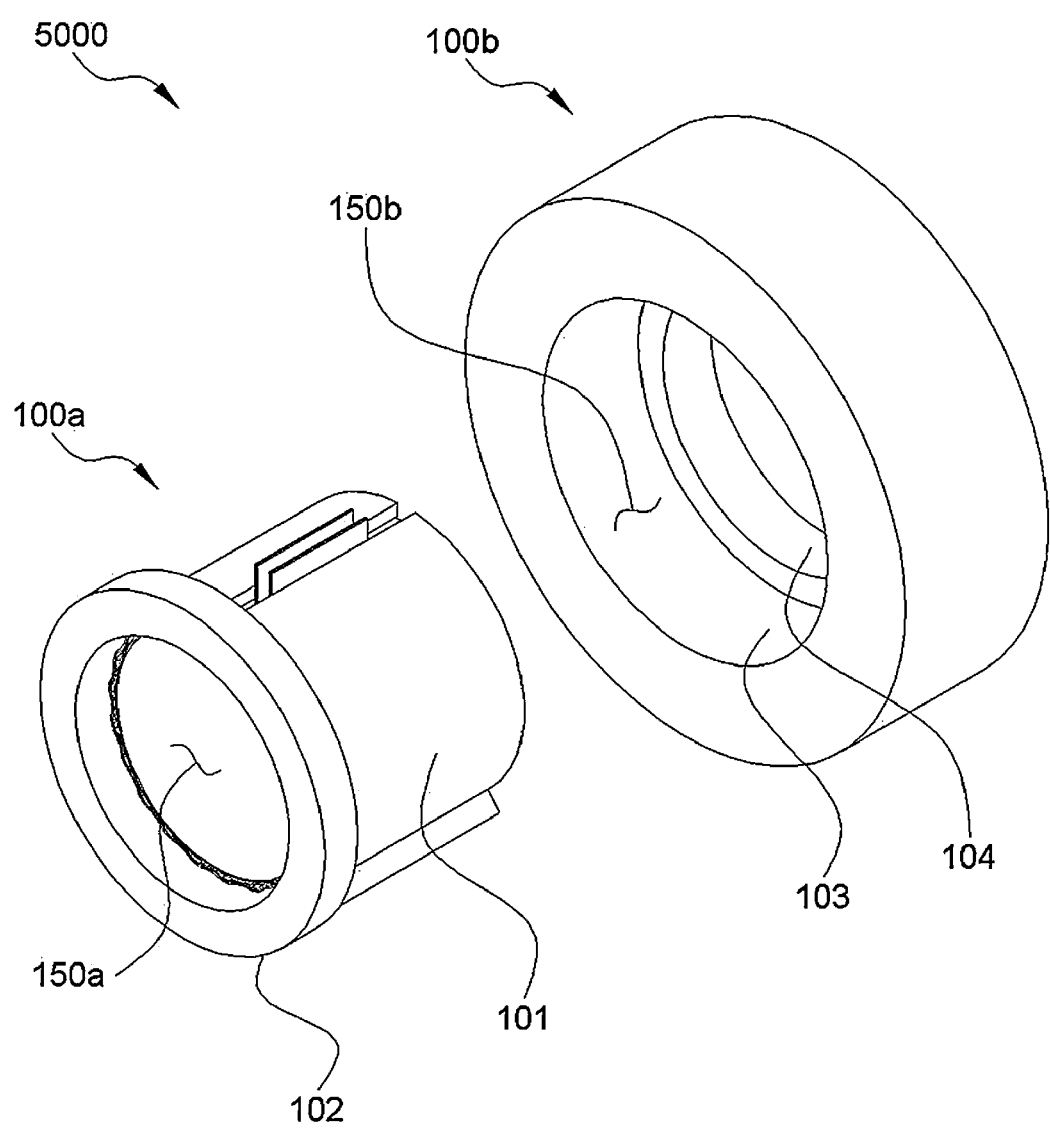

FIGS. 11 and 12 are exploded perspective views illustrating housings 100a and 100b and a foil part F5 of an air foil journal bearing 5000 according to a fifth embodiment of the present invention.

The housing of the air foil journal bearing 5000 may include the first housing 100a into which the foil part F5 is inserted, and the second housing 100b to which the first housing 100a coupled to the foil part F5 is coupled.

A hollow portion 150a is formed in the first housing 100a. The first housing 100a includes a first body 101 into which the foil part F5 is fitted, and a second body 102 formed at one side of the first body 101 based on the axial direction and having a larger outer diameter than the first body 101. The first key groove 110 may be formed in the first body 101 so that the first bent portions 250 of the top foil 200 are inserted into the first key groove 110, and the second key groove 120 may be formed in the first body 101 so that the second bent portions 350 of the bump 300 are inserted into the second key groove 120. The first key groove 110 and the second key groove 120 may each be provided in the form of a slit cut out from the other side to one side of the first body 101 based on the axial direction.

A hollow portion 150a is formed in the second housing 100b. The second housing 100b includes a third body 103 into which the first housing 100a is fitted, and a fourth body 104 formed at the other side of the third body 103 based on the axial direction and having a smaller inner diameter than the third body 103. Therefore, the first housing 100a is inserted into an inner circumferential surface of the third body 103, and an outer circumferential surface of the first body 101 is coupled, by fitting, (press-fitted) to an inner circumferential surface of the third body 103. In addition, an outer circumferential surface at the other side of the second body 102 based on the axial direction is coupled, by fitting, to an inner circumferential surface of the fourth body 104.

Meanwhile, one end of the second bent portion 350 based on the axial direction may be in contact with the other side of the first body 101 based on the axial direction, and the other end of the second bent portion 350 based on the axial direction may be in contact with and fixed to one side of the fourth body 104 based on the axial direction, such that the axial movement of the second bent portion 350 may be restricted.

Embodiment 6

Figure 13:
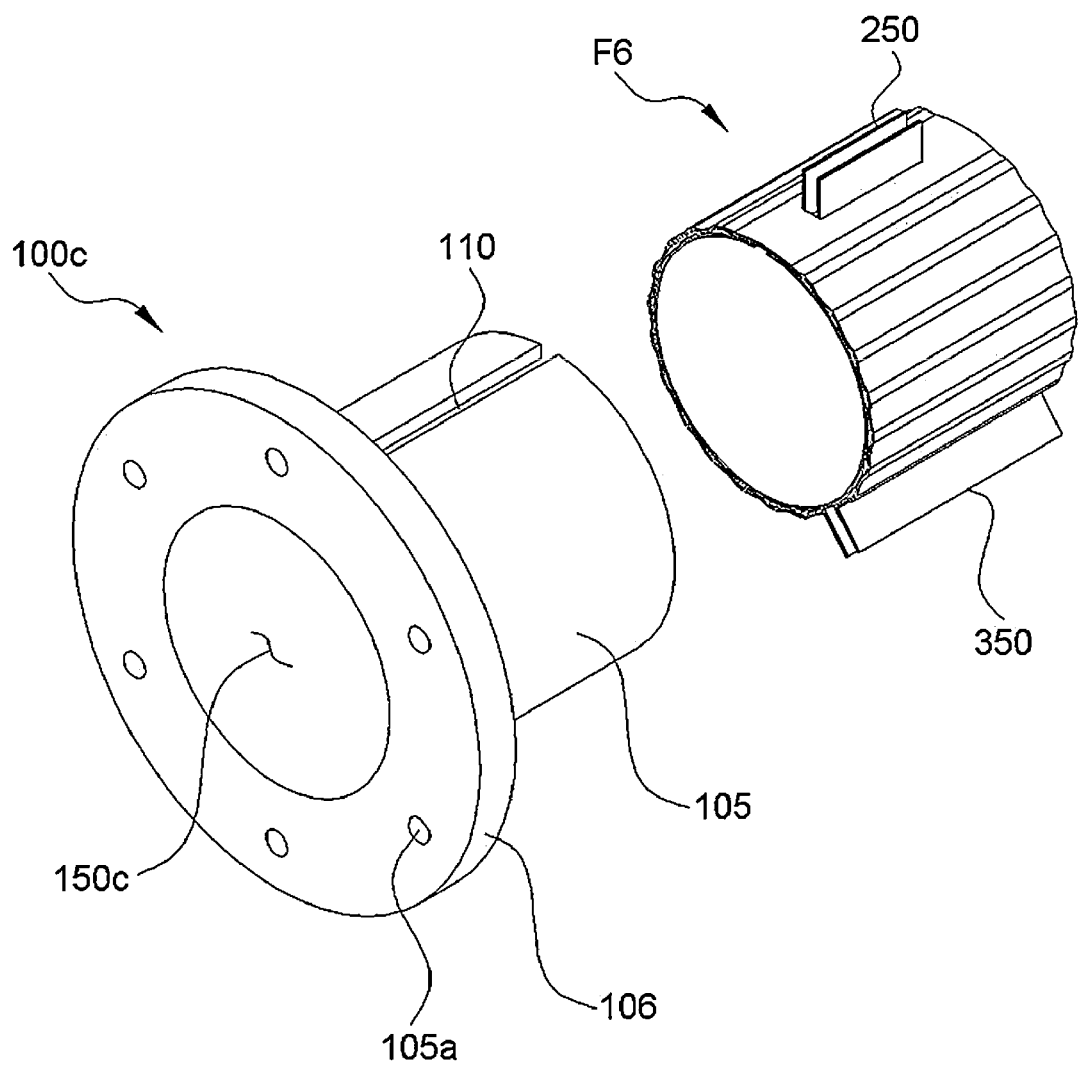
FIGS. 13 and 14 are exploded perspective views of a housing and a foil part of an air foil journal bearing according to the sixth embodiment of the present invention.
Figure 14:
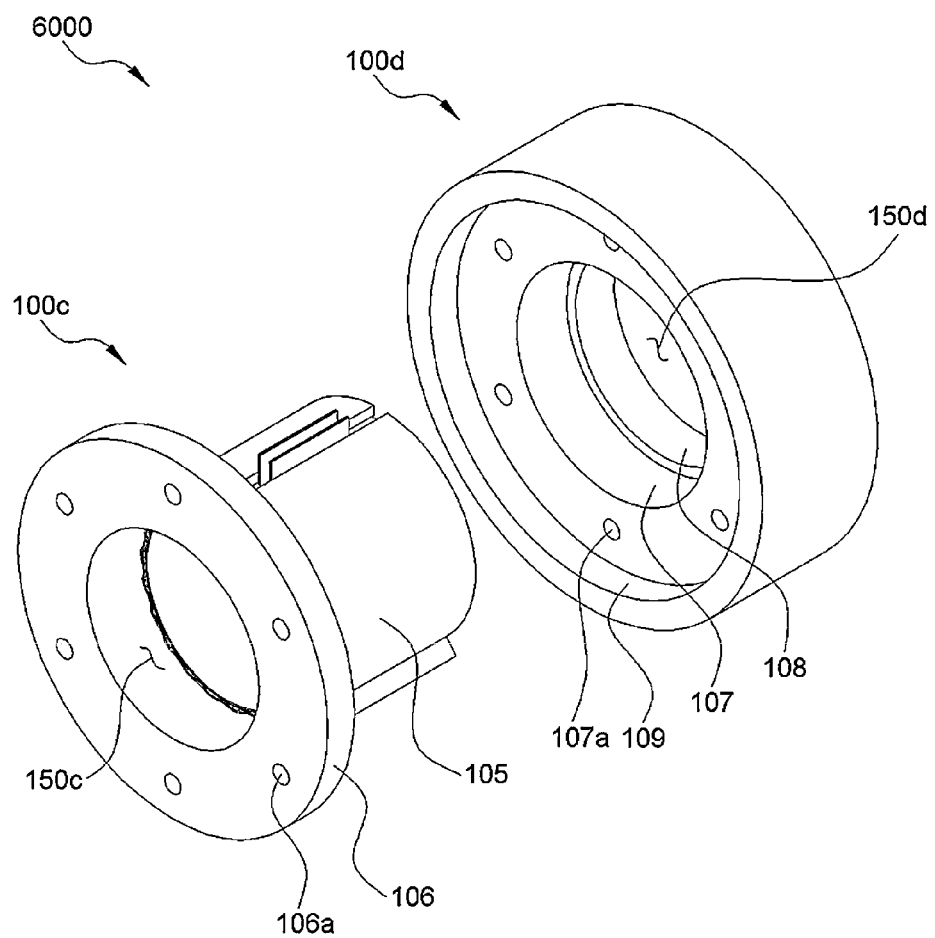

FIGS. 13 and 14 are exploded perspective views of housings 100c and 100d and a foil part F6 of an air foil journal bearing 6000 according to a sixth embodiment of the present invention.

The housing of the air foil journal bearing 6000 includes the first housing 100c into which the foil part F6 is inserted, and the second housing 100d to which the first housing 100c coupled to the foil part F6 is coupled.

A hollow portion 150c is formed in the first housing 100c. The first housing 100c includes a fifth body 105 into which the foil part F6 is fitted, and a sixth body 106 formed at one side of the fifth body 105 based on the axial direction and having a larger outer diameter than the fifth body 105. The first key groove 110 may be formed in the fifth body 105 so that the first bent portions 250 of the top foil 200 are inserted into the first key groove 110, and the second key groove 120 may be formed in the fifth body 105 so that the second bent portions 350 of the bump 300 are inserted into the second key groove 120. The first key groove 110 and the second key groove 120 may each be provided in the form of a slit cut out from the other side to one side of the fifth body 105 based on the axial direction.

In addition, first bolting holes 106a may be formed in the sixth body 106 and disposed at equal intervals in the circumferential direction so that the sixth body 106 is coupled to the second housing 100d by bolting.

A hollow portion 150d is formed in the second housing 100d. The second housing 100d includes a seventh body 107 into which the fifth body 105 is fitted, an eighth body 108 formed at the other side of the seventh body 107 based on the axial direction and having a smaller inner diameter than the seventh body 107, and a ninth body 109 formed at one side of the seventh body 107 based on the axial direction and having a larger inner diameter than the seventh body 107 so that the sixth body 106 is fitted into the ninth body 109. In addition, second bolting holes 107a may be formed in the seventh body 107 and correspond to the first bolting holes 106a.

Therefore, the fifth body 105 is inserted into an inner circumferential surface of the seventh body 107, and the sixth body 106 is coupled, by fitting, to an inner circumferential surface of the ninth body 109, such that the sixth body 106 and the seventh body 107 are coupled by bolting by means of the first and second bolting holes 106a and 107a. In addition, an outer circumferential surface at the other side of the fifth body 105 based on the axial direction is coupled, by fitting, to an inner circumferential surface of the eighth body 108.

Meanwhile, one end of the second bent portion 350 based on the axial direction may be in contact with the other side of the sixth body 106 based on the axial direction, and the other end of the second bent portion 350 based on the axial direction may be in contact with and fixed to one side of the eighth body 108 based on the axial direction, such that the axial movement of the second bent portion 350 may be restricted.

Embodiment 7

Figure 15:
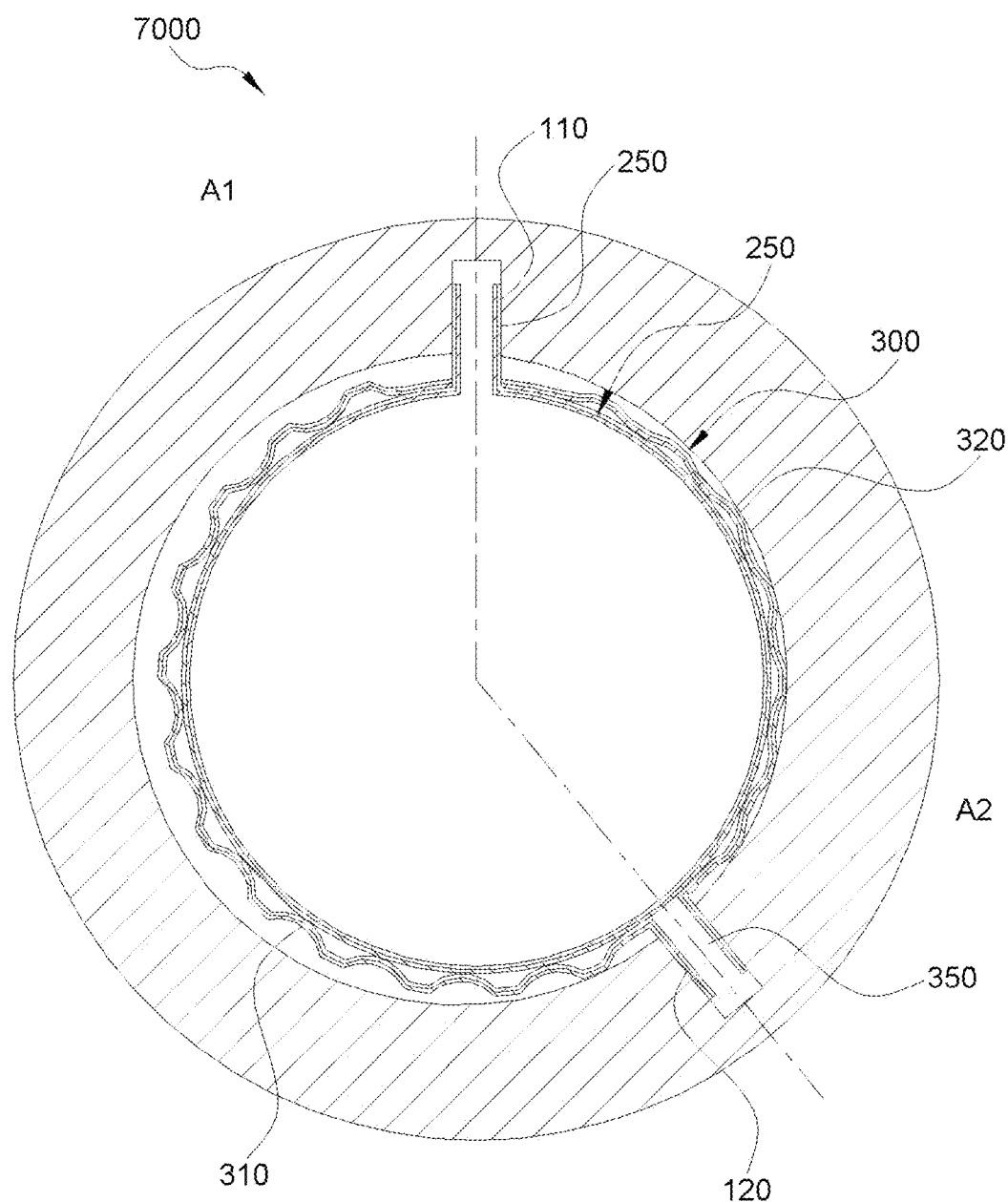
FIG. 15 is a cross-sectional view of an air foil journal bearing according to a seventh embodiment of the present invention.
Figure 16:
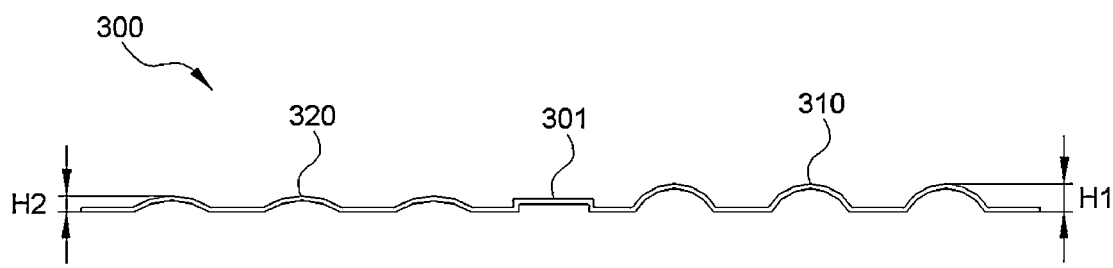
FIG. 16 is a deployed cross-sectional view of a bump of the air foil journal bearing according to the seventh embodiment of the present invention.

FIG. 15 is a cross-sectional view of an air foil journal bearing 7000 according to a seventh embodiment of the present invention, and FIG. 16 is a deployed cross-sectional view of the bump 300 of the air foil journal bearing 7000 according to the seventh embodiment of the present invention.

As illustrated, the bearing 7000 includes the housing 100 configured to accommodate the top foil 200 and the bump 300, the top foil 200 provided between the rod (not illustrated) and the hollow portion 150 of the housing 100, and the bump 300 provided between the housing 100 and the top foil 200.

Because the coupling relationship between the above-mentioned components is identical and similar to that of the bearing 1000 according to the first embodiment, a detailed description thereof will be omitted.

Meanwhile, the bump 300 of the bearing 7000 according to the embodiment of the present disclosure may be disposed between the top foil 200 and the inside of the hollow portion 110 of the housing 100. The bump 300 may be in close contact with the inner circumferential surface of the housing 100 and disposed in the circumferential direction. In this case, the bump 300 is provided in the form of a plate having a small thickness. The bump 300 may have a plurality of protruding portions 310 and 320 convexly protruding radially inward and spaced apart from one another in the circumferential direction.

In this case, heights by which the protruding portions 310 and 320 protrude may be different from one another depending on regions positioned on the bump 300. That is, based on the side at which the first bent portion 110 is formed and the side at which the second bent portion 120 is formed, a region defined in the rotation direction of the rotor from the side at which the second bent portion 120 is formed to the side at which the first bent portion 110 is formed is defined as a first region A1, and a region defined in the rotation direction of the rotor from the side at which the first bent portion 110 is formed to the side at which the second bent portion 120 is formed is defined as a second region A2. In this case, the first protruding portion 310 formed in the first region A1 and the second protruding portion 320 formed in the second region A2 may have different protruding heights. That is, based on a flat portion 301 of the bump 300 in which the insertion fixing portion 310 is formed, the first protruding portion 310 may be formed at a side opposite to the rotation direction, and the second protruding portion 320 may be formed at the side in the rotation direction. A protruding length H1 of the first protruding portion 310 may be longer than a protruding length H2 of the second protruding portion 320. With the above-mentioned configuration, the inner surface of the top foil 200, which is in close contact with the inner portion of the bump 300, has a lobe shape to prevent self-excited vibration of the rotor that rotates in the top foil 200. Therefore, it is possible to ensure the rotational stability of the rotor and improve the high-speed stability in comparison with a bearing having a circular hollow portion.

Therefore, the effect of further reducing costs may be obtained by implementing the lobe shape by simply making the protruding lengths of the protruding portions 310 and 320 of the bump 300 different from one another even without processing a lobe shape from a hollow portion shape of a bearing through mechanical processing. The present invention is not limited to the two regions. Three or more regions may be implemented, as necessary, and protruding portions having different protruding lengths may be formed in the separated regions. In this case, the protruding lengths of the protruding portions in the same region may be equal to one another, and a difference in length between the protruding portions may be set to 0.01 mm to 0.1 mm.

In addition, a ratio of a circumferential length in the first region A1 to a circumferential length in the second region A2 may be at most 65%:35% and at least 55%:45%.

The technical spirit should not be construed as being limited to the embodiments of the present invention. Of course, the scope of application is diverse, and various modifications and implementations may be made by those skilled in the art without departing from the subject matter of the present invention claimed in the claims. Accordingly, these improvements and modifications will fall within the scope of the present invention as long as they are apparent to those skilled in the art.

What is claimed is:

1. A housing fixing structure of an air foil journal bearing comprising:
    a housing having a hollow portion in which a rotor is disposed, the housing comprising a first key groove concavely formed radially outward from an inner circumferential surface of the housing so as to be connected to the hollow portion;
    a top foil provided inside the housing, formed in a circumferential direction, and having a pair of first bent portions formed by bending two opposite circumferential ends of the top foil radially outward, the pair of first bent portions being inserted into the first key groove; and
    a bump provided between the housing and the top foil and formed in the circumferential direction,
    wherein the bump comprises:
    an insertion fixing portion formed through the bump so that the first bent portions of the top foil penetrate the insertion fixing portion and are fitted into the first key groove; and
    second bent portions formed by bending two opposite circumferential ends of the bump radially outward,
    wherein the housing comprises a second key groove disposed to be spaced apart circumferentially from the first key groove and concavely formed radially outward from the inner circumferential surface of the housing so as to be connected to the hollow portion, and
    wherein the second bent portions are fitted into the second key groove.

2. The housing fixing structure of claim 1, wherein a circumferential width of the second key groove is larger than a sum of circumferential thicknesses of the pair of second bent portions, and
    wherein the bump is configured such that a second-first bent portion formed at one end and a second-second bent portion formed at the other end are spaced apart from each other by a predetermined distance in the circumferential direction and inserted into the second key groove.

3. The housing fixing structure of claim 1, wherein a circumferential width of the second key groove is larger than a sum of circumferential thicknesses of the pair of second bent portions,
    wherein the second bent portions comprises a second-first bent portion formed at one end of the bump, and a second-second bent portion formed at the other end of the bump,
    wherein the second-first bent portion comprises:
    a first inclined portion bent radially outward and inclined radially outward toward the second-second bent portion; and
    a first junction portion bent radially outward from the first inclined portion, and
    wherein the second-second bent portion comprises:
    a second inclined portion bent radially outward and inclined radially outward toward the second-first bent portion; and
    a second junction portion bent radially outward from the second inclined portion and joined to the first junction portion.

4. The housing fixing structure of claim 3, wherein the bearing further comprises a fixing pin coupled to the second key groove to fix the first and second junction portions.

5. The housing fixing structure of claim 1, wherein the first bent portion has two opposite axial ends spaced apart inward from two opposite axial ends of the top foil, and an axial width of the insertion fixing portion corresponds to an axial length of the first bent portion.

6. The housing fixing structure of claim 1, wherein a direction opposite to rotation of the rotor is defined as first direction and a direction of rotation of the rotor is defined as second direction, the bump comprises:
a first region formed along the first direction from the first key groove to the second key groove; and
a second region formed along the second direction from the first flexible key groove to the second key groove, and
wherein a protruding length of a first convex portion formed in the first region and a protruding length of a second convex portion formed in the second region are different from each other.

7. The housing fixing structure of claim 6, wherein when a circumferential length of the first region is longer than a circumferential length of the second region, the protruding length of the first convex portion is longer than a protruding length of the second convex portion.

8. The housing fixing structure of claim 6, wherein the bearing is configured such that the protruding lengths of the protruding portions formed in the same region are equal to one another.

9. The housing fixing structure of claim 6, wherein a difference in length between the first protruding portion formed in the first region and the second protruding portion formed in the second region is 0.01 mm to 0.1 mm.

10. The housing fixing structure of claim 6, wherein a ratio of a circumferential length of the first region to a circumferential length of the second region is at most 65%: 35% and at least 55%: 45%.

11. The housing fixing structure of claim 1, wherein a direction opposite to rotation of the rotor is defined as first direction and a direction of rotation of the rotor is defined as second direction, and
the first circumferential distance of the hollow part formed from the first key groove to the second key groove in the first direction is longer than the second circumferential distance of the hollow part formed from the first key groove to the second key groove in the second direction.

* * * * *